M. E. LEEDS.
ELECTRICAL MEASURING APPARATUS.
APPLICATION FILED APR. 8, 1914.

1,132,591.

Patented Mar. 23, 1915.

3 SHEETS—SHEET 1.

WITNESSES
Daniel Webster, Jr.
Nellie B. Evans.

INVENTOR
Morris E. Leeds
Cornelius D. Ehret
BY
his ATTORNEY

M. E. LEEDS.
ELECTRICAL MEASURING APPARATUS.
APPLICATION FILED APR. 8, 1914.
1,132,591.
Patented Mar. 23, 1915.
3 SHEETS—SHEET 2.
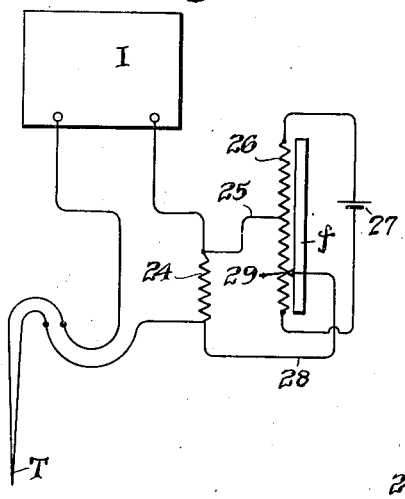
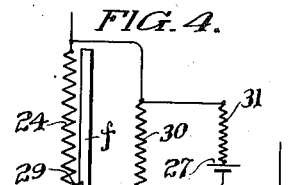
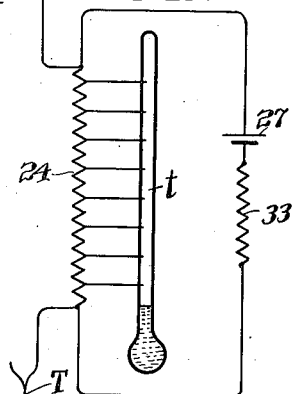
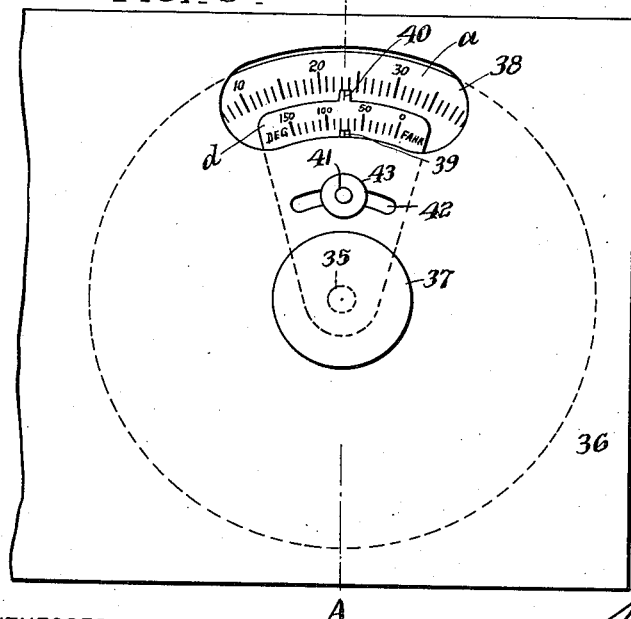
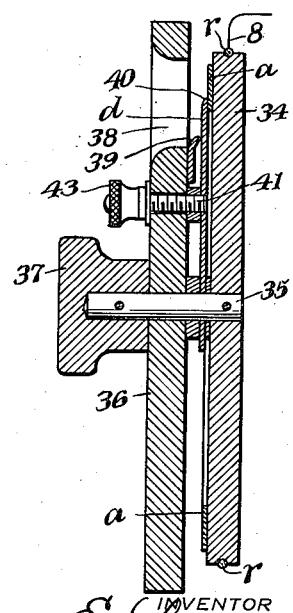

M. E. LEEDS.
ELECTRICAL MEASURING APPARATUS.
APPLICATION FILED APR. 8, 1914.
1,132,591.
Patented Mar. 23, 1915.
3 SHEETS—SHEET 3.
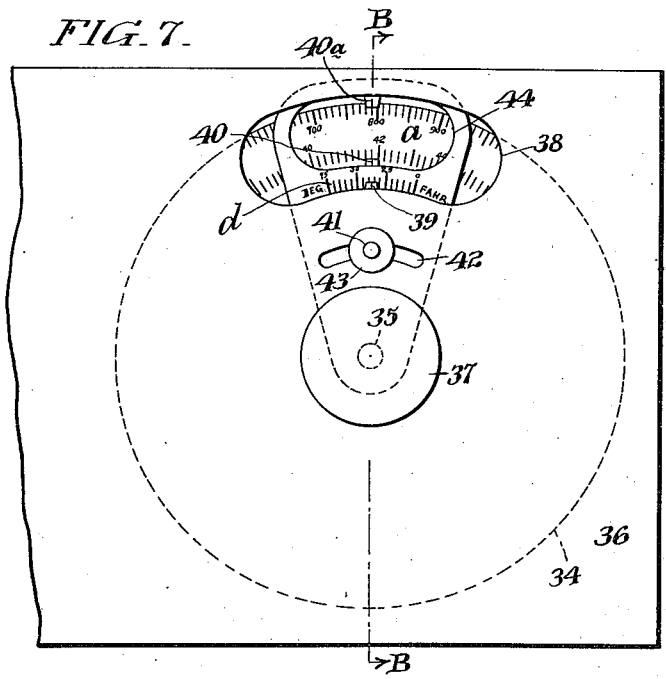
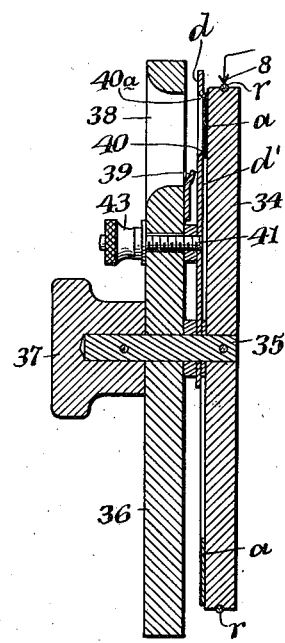
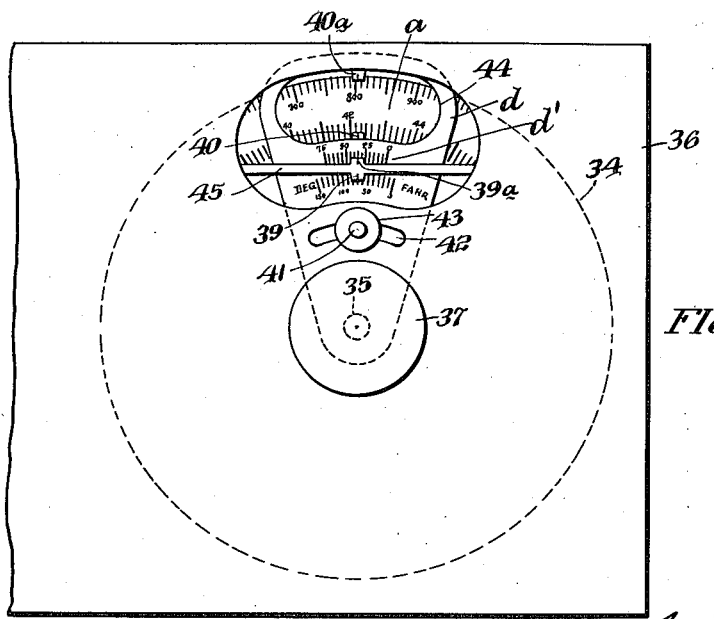

UNITED STATES PATENT OFFICE.

MORRIS E. LEEDS, OF PHILADELPHIA, PENNSYLVANIA, ASSIGNOR TO THE LEEDS & NORTHRUP COMPANY, OF PHILADELPHIA, PENNSYLVANIA, A CORPORATION OF PENNSYLVANIA.

ELECTRICAL MEASURING APPARATUS.

1,132,591. Specification of Letters Patent. Patented Mar. 23, 1915.

Application filed April 8, 1914. Serial No. 830,322.

*To all whom it may concern:*

Be it known that I, MORRIS E. LEEDS, a citizen of the United States, residing in the city and county of Philadelphia, State of Pennsylvania, have invented certain new and useful Improvements in Electrical Measuring Apparatus, of which the following is a specification.

My invention relates to apparatus, circuits or systems in which thermoelectric couples are employed for any purpose, such as temperature measurements or pyrometry.

My invention resides in means for correcting for variations in temperature of one of the junctions of a thermo-couple, generally the cold junction, from a given or predetermined temperature at which that junction was maintained in calibrating the thermo-couple or the apparatus in conjunction with which it is used.

Figure 1:
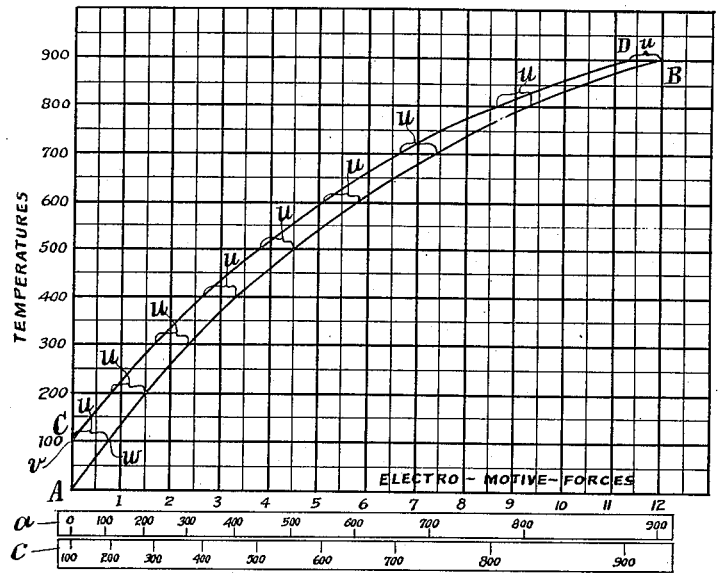
Figure 2:
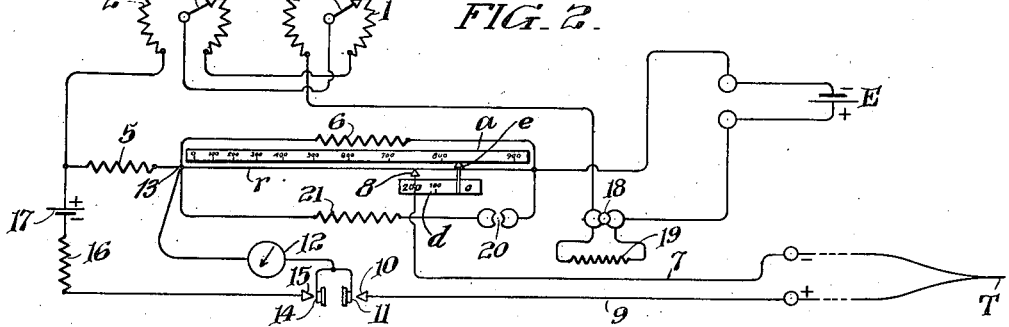

For explanation of my invention and for illustration of some of many forms my invention may take reference is to be had to the accompanying drawings, in which:

Figure 1 is a graphic representation of relations existing between temperatures and electro-motive-forces of a thermo-couple, together with derivatives from such relations. Fig. 2 is a diagrammatic illustration of the circuits and parts of a thermo-couple pyrometer involving the use of a potentiometer. Fig. 3 is a diagrammatic view of means for electrically correcting for temperature variations of a junction of a thermo-couple from a given or predetermined temperature. Fig. 4 is a modification of the form of the invention shown in Fig. 3. Fig 4$^a$ is a further modification of the form of the invention shown in Fig. 3. Fig. 4$^b$ is a further modification of the form shown in Fig. 3. Fig. 5 is an elevational view of the main scale and correction scale. Fig. 6 is a sectional view taken on the line A—A of Fig. 5. Fig. 7 is a front elevational view of an arrangement of double main scale with correction scale. Fig. 8 is a sectional view on the line B—B of Fig. 7. Fig. 9 is a front elevational view of an arrangement of double range main and double range correction scales.

In thermo-couple pyrometry the temperature readings are based upon the fact that there is generated by the thermo-couple an electro-motive-force which is a function of the difference between the temperatures of the hot and cold junctions of the thermo-couple. In most cases it is the temperature existing at one of the junctions and not the difference between the temperatures of the junctions of the couple which is the unknown quantity to be measured. It is accordingly necessary either to maintain one junction of the thermo-couple at a constant known temperature or, if this is not done, to apply a correction for the variation in temperature of such junction of the couple from a given temperature. And it is to means for making such correction that this invention relates, to the end that the scale readings of the indicating or measuring apparatus will directly give, notwithstanding variations in the temperature of one of the thermo-couple junctions, the unknown temperature of the other junction, without recourse to computation, tables, calibration curves, or the like.

The electro-motive-force generated by a thermo-couple is a function not only of the difference between the temperatures of its two junctions but varies also with the absolute temperatures of its junctions. Thus the electro-motive-force generated by a thermo-couple for a temperature difference of one hundred degrees between its two junctions, one of which is at zero degrees and the other at one hundred degrees, is, generally speaking, quite different in value from the electro-motive-force generated by the same thermo-couple when there is a temperature difference of one hundred degrees between its two junctions, when one junction is at nine hundred degrees while the other is at one thousand degrees. From this fact it is impossible, with most thermo-couples, to make a true or accurate correction simply by changing the reading of the instrument by an amount corresponding with the temperature variation of one junction of the couple from the temperature at which that junction was maintained during calibration of the couple.

A characteristic calibration curve of a thermo-couple with one of its junctions maintained at a temperature of zero while the other is subjected to temperatures ranging up to nine hundred degrees is shown, with its curvature exaggerated for purposes of clearness, in Fig. 1, the calibration curve being the curved line A, B.

The characteristic of a thermo-couple which is important for consideration here, may be stated as follows: Assuming any three temperatures, $x$, $y$ and $z$, $y$ being higher than $x$, and $z$ being higher than $y$, and subjecting one junction of a thermo-couple to temperature $x$ and the other junction to a temperature $z$, and then increasing the temperature of the first junction from temperature $x$ to temperature $y$, the electromotive-force generated by the thermo-couple in the latter case will be decreased from the value of the electro-motive-force produced by it when one junction is at temperature $x$ and the other at temperature $z$ by a value of electro-motive-force which the same thermo-couple would generate if its one junction were at temperature $x$ and the other at temperature $y$.

The thermo-couple is usually calibrated by maintaining one of its junctions at a known low temperature and by measuring directly or indirectly the electro-motive-forces generated by the couple when its other junction is at various known higher temperatures.

The calibration curve A, B, of Fig. 1, above referred to, represents such a calibration curve whose abscissæ are electro-motive-forces and whose ordinates are temperatures. Below the curve is a scale $a$ for a reading instrument of a character whose indications are proportional to the electro-motive-forces, when used in connection with the thermo-couple whose calibration curve is A, B. The points 100, 200,—900 of this scale are found by projecting downwardly from the points of intersection between the curve A, B and the horizontal lines opposite the temperatures 100, 200,—900 of the curve sheet.

Taking into consideration now the above-described characteristic of thermo-couples a derived curve may be plotted for the same thermo-couple with its cold end at any other than zero temperature. The curve C, D is such a derived curve for the case where the cold junction of the thermo-couple is maintained at a temperature of 100 degrees. It is derived as follows:

On the horizontal line opposite the temperature 100 degrees there is measured to the left, from the point where the curve A, B intersects that line, a distance equal to the electro-motive-force generated by the couple when its hot junction is at one hundred degrees shown by curve A, B. Accordingly the first point of the curve C, D is at zero electro-motive-force and on the line opposite one hundred degrees. At each of the other temperatures exactly the same distance is measured off to the left from the curve A, B and through these points the curve C, D is drawn. In other words, the distance from point $v$ to point $w$ corresponds with the electro-motive-force generated by the couple when its one junction is at zero degrees and its other junction at 100 degrees. This distance $u$ is measured off to the left of curve A, B on each horizontal line of the curve sheet, and the curve C, D then drawn through these derived points. Below the curve sheet is the corresponding scale $c$ derived from curve C, D as was scale $a$ from curve A, B, for the same proportionally reading or indicating instrument.

Throughout the following description and claims there will be used for brevity and simplicity terms as follows: The temperature to be measured and the junction of the thermo-couple subjected to that temperature will be known as the "unknown temperature" and "hot junction", respectively, whether that junction be at higher, same or lower temperature than the temperature of the other junction; the constant known temperature and the other junction subjected to that temperature during calibration of the thermo-couple will be known as the "calibration temperature" and "cold junction" respectively, whether that junction be at lower, same or higher temperature than the hot junction, and the known temperature to which said cold junction may have varied when a measurement is made will be known as the "reference temperature".

From the foregoing it will be seen that where the "reference temperature" differs from the "calibration temperature", the electro-motive-force reading is corrected by adding or subtracting the electro-motive-force which would be produced by the thermo-couple when one junction is at the "calibration temperature" and the other junction is at the "reference temperature". And it will be seen that there is no direct arithmetical relation between the temperature variations of the cold junction and the corrections to be applied to the temperature readings.

In Fig. 2 the reading or indicating instrument is a potentiometer. Here the slide wire or resistance $r$ is associated with a scale $a$ which may read in milli-volts or temperatures, and when reading in temperatures may be derived from the calibration curve of the thermo-couple by the method described in connection with Fig. 1. The resistance $r$ is connected in series with the battery E, or other source of electro-motive-force preferably more or less constant, and the resistances 1 and 2, more or less of which may be brought into circuit by the adjustable or movable contacts 3 and 4, and the resistance 5. In shunt with the resistance $r$ may be connected the resistance 6 to assure a predetermined resistance in the circuit between the terminals of the resistance $r$. One terminal of the hot thermo-junction T connects by conductor 7 with the movable contact 8 movable over the resistance $r$; the other terminal of the junction T connects by conductor 9 with the contact 10 into engagement with which may be pressed the key contact 11 connected with one terminal of any suitable instrument such as a galvanometer 12 whose other terminal is connected to the terminal 13 of the resistance $r$. One terminal of the galvanometer 12 is also connected with key contact 14 adapted to be pressed into engagement with the contact 15 which connects through the resistance 16 with one terminal of the standard cell 17 whose other terminal connects as shown with the circuit including the resistance $r$. To change the range of the instrument the plug 18 may be withdrawn from between the blocks forming the terminals of resistance 19, thus bringing the resistance 19 into the circuit of battery E and resistance $r$, and inserted into the hole 20 between blocks whereby the resistance 21 is thrown into shunt with resistance $r$.

The operation is as follows: The contact or key 14 is depressed into engagement with contact 15 and then the large resistance 2 and thereafter the small resistance 1 are adjusted until the galvanometer 12 points to zero, that is, until there is no current through the galvanometer 12, this being the usual method of securing the proper current strength in the potentiometer circuit. Now the key or contact 11 is depressed into engagement with contact 10 and the contact 8 is moved along the resistance $r$ until the galvanometer again indicates zero current through it, in which case a reading may be taken from the scale $a$ opposite contact 8 corresponding to the temperature of the hot junction if the cold junction is at the calibration temperature. If however the cold junction is at a temperature other than the calibration temperature the reference temperature is read on a thermometer located at the cold junction and the correction scale $d$ having pointer $e$ is moved with respect to the contact 8 until the contact 8 is over that temperature marking on the scale $d$ which corresponds to the reference temperature or the thermometer reading at the cold junction of the thermo-couple. Then the key 11 is depressed and the scale $d$ with contact 8 moved along the resistance $r$ until the galvanometer 12 indicates no current in which case the temperature of the hot junction T will be found on scale $a$ opposite the auxiliary scale pointer $e$. The scale $d$ is marked exactly as the left end of the scale $a$ would be if calibrated in temperatures through a range of temperatures sufficient to cover all variations of the reference temperature.

If the plug 18 is removed from the place indicated in Fig. 2 and placed in the hole 20 the range of the instrument is changed as above stated. Where such auxiliary resistances 19 and 21 are employed the scales $a$ and $d$ will each have a second series of markings corresponding to the second range.

In the arrangement of Fig. 2 the auxiliary scale $d$ is preferably always calibrated in temperatures, while the main scale $a$ may be calibrated in temperatures or milli-volts, or both.

In Fig. 3 is illustrated a method for correction of temperature variation of one junction of the thermo-couple in which any kind of reading or indicating instrument, that is, either a deflection or null method instrument, may be used. This instrument is indicated at I and may be a potentiometer such as above described, without the temperature correcting means, or may be any other null or deflection instrument as stated. In one of the leads to the thermo-couple T is inserted a resistance 24 whose one terminal is connected by conductor 25 to preferably the mid point in a resistance 26 connected in circuit with a battery 27 or source of current of more or less constant electro-motive-force; and the other terminal of the resistance 24 connects by conductor 28 with the contact 29 movable over the resistance 26, there being associated with the movable contact 29 a correction scale $f$ graduated in temperatures of a range corresponding with a range through which the cold junction of the thermo-couple T may vary. The resistances are so proportioned with respect to each other and the electro-motive-force of the source 27 that when the contact 29 is set opposite the temperature marking on scale $f$ corresponding with the reference temperature the potential drop across resistance 24 will be equal in amount and in proper direction to correct for the difference between the reference and calibration temperatures.

In Fig. 4 the resistance 24 connected in a thermo-couple lead, as in Fig. 3, is traversed by a movable contact 29 with which is associated the correction scale $f$, the resistance 30 having its one terminal connected to the terminal of resistance 24 and its other terminal to the movable contact 29, and in shunt with the resistance 30 are connected the resistance 31 and the source of current 27 similar to the source 27 of Fig. 3. Here again the contact 29 is moved to the point on the scale $f$ which corresponds to the reference temperature.

In Fig. 4ª the resistance 24 is connected in the thermo-couple lead and its one terminal connects with the resistance 32 over which the contact 29 is movable and with which latter is associated the correction scale $f$. The contact 29 is connected to one terminal of the source of current 27, similar to source 27 of Fig. 3, whose other terminal connects with the remaining terminal of resistance 24. Here again the contact 29 is moved along resistance 32 to a point on scale $f$ corresponding with the reference temperature.

In Fig. 4$^b$ the resistance 24 is connected in a thermo-couple lead as in Fig. 3 and various taps are taken therefrom and lead into the interior of a thermometer $t$ placed at the cold junction of the thermo-couple. The resistance 24 is connected in series with the source 27, like source 27 of Fig. 3, and a resistance 33. As the mercury or other conductor within the thermometer rises in response to rise of temperature at the cold junction of the thermo-couple more and more of the resistance 24 is short circuited, whereby the temperature correction is automatically made by automatically changing the correcting electro-motive-force introduced into the thermo-couple circuit, and the correcting electro-motive-force will decrease with rising temperature.

In the arrangement of Figs. 3 to 4$^b$ the instrument I may be a deflecting instrument, such as a galvanometer, ammeter, volt meter, electrometer, or a non-deflecting instrument, such as a torsion dynamometer or a potentiometer.

In Fig. 5 is shown an arrangement for the main and correction scales and the resistance $r$ of a system such as illustrated in Fig. 2 when the auxiliary correction scale $d$ is used in connection with contact 8. In place of moving the contact 8 resistance $r$ may be moved with respect to contact 8 and means for such purpose are shown in Figs. 5 and 6, where the resistance $r$ is disposed upon the periphery of an insulating disk 34, the contact 8 being shown as stationary. The disk 34 is secured upon the shaft 35 which extends through the cover 36 of the instrument and which may be rotated by the handle 37 to adjust the resistance $r$ with respect to contact 8. Carried by the disk 34 is the main scale $a$, (here shown calibrated in milli-volts but which may be calibrated in temperatures) visible through the aperture 38 in the cover 36. The scale $d$ is of relatively small angular extent and, as hereinbefore stated, corresponds in its markings exactly with the low temperature end of scale $a$ when the latter is calibrated in temperatures. Fixed to the inside of the cover 36 is a stationary pointer 39 coöperating with scale $d$, and the scale $d$ carries a pointer 40 coöperating with scale $a$. The scale $d$ is loosely pivoted upon the shaft 35 and has secured to it one end of a screw threaded rod or bolt 41 which extends through an arc shaped slot 42 in the cover 36, the member 41 carrying a nut 43.

When the temperature at the cold junction of the thermo-couple has been read upon a thermometer, the scale $d$ is swung to right or left by grasping the nut 43 upon bolt 41 until that temperature marking on scale $d$ corresponding with the temperature of the cold junction is brought opposite pointer 39, when the operator by turning the nut 43 clamps the scale $d$ in that position in fixed relation with the cover 36. Thereupon the operator rotates the handle 37 to right or left until the galvonometer indicates zero current, this action having in effect adjusted contact 8 upon resistance $r$, whereupon a reading is taken on scale $a$ opposite pointer 40 corresponding to the unknown temperature.

In Fig. 7 a similar structure is shown. In this case there are two scales $a$ movable with the member 34, the upper of these scales being calibrated in temperatures while the lower is calibrated in the corresponding milli-volts. In this case the correction scale member $d$ has an aperture 44 through which the scales $a$ may be viewed, and on opposite edges of the aperture 44 are the pointers 40 and 40$^a$ coöperating respectively with the milli-volt and temperature scales. The scale $d$ is in temperatures, covering the range of reference temperatures, and coöperates as in the case of Fig. 5 with the stationary pointer 39. By this construction the scale $d$ is first clamped with respect to pointer 39 with that reading of the scale opposite the pointer 39 that corresponds with the temperature of the cold junction. Then by balancing the instrument, that is, by turning the handle 37 until the galvanometer shows no current, the milli-volts may be read opposite the pointer 40 and the unknown temperature of the hot junction opposite pointer 40$^a$.

Fig. 9 is similar to Fig. 7, except that there are two temperature scales $d$ and $d'$ to correspond with two ranges of the instrument depending upon the position of the plug 18, of Fig. 2, for example. The stationary pointer 39 in this case coöperates with the lower scale $d$ and is carried by the part 45 secured to the cover 36 and extending across the aperture 38. The second pointer 39$^a$ is carried by the member 45 and coöperates with the upper scale $d'$. The upper scale $a$ is shown calibrated in temperatures and is used with the upper scale $d$ with which coöperates pointer 39$^a$. And the lower scale $a$ is here shown calibrated in milli-volts, but they are the milli-volts for the other range of the instrument. And with this lower scale $a$ is used the lower scale $d$ which coöperates with pointer 39. It will be understood of course that the upper scale $a$ may be calibrated in milli-volts, and that the lower scale $a$ may be calibrated in temperatures, or both in temperatures or both in milli-volts, as may be desired. The operation is the same as described in connection with Fig. 5, the lower scale $a$ and the lower $d$ being used together, when the upper scale $a$ and the upper scale $d'$ are not in use; and vice versa.

What I claim is:

1. The combination with a thermo-couple, of a reading instrument associated therewith, said reading instrument having a scale derived from the calibration of said thermo-couple with its cold junction maintained at constant calibration temperature, a correction scale carrying a pointer coöperating with said first named scale, circuit adjusting means, and means for adjusting said correction scale pointer with respect to said circuit adjusting means to a point corresponding with the reference temperature of the cold junction of said thermo-couple at the time the reading is made.

2. The combination with a thermo-couple, of a reading instrument associated therewith, said reading instrument having a scale, a correction scale carrying a pointer coöperating with said first named scale, circuit adjusting means, and means for adjusting said correction scale pointer with respect to said circuit adjusting means to a point corresponding with the reference temperature of the cold junction of said thermo-couple at the time the reading is made.

3. The combination with a thermo-couple, of a reading instrument having a main scale derived from a calibration of said thermo-couple with its cold junction maintained at constant calibration temperature, a correction scale, a member with respect to which both said scales are movable, a pointer on said member, means for adjusting said correction scale with respect to said pointer to a marking on said correction scale corresponding with the reference temperature to which the cold junction of said thermo-couple has varied, and a second pointer carried by said correction scale and coöperating with said main scale.

4. The combination with a thermo-couple, of a reading instrument having a main scale, a correction scale, a member with respect to which both said scales are movable, a pointer on said member, means for adjusting said correction scale with respect to said pointer to a marking on said correction scale corresponding with the reference temperature to which the cold junction of said thermo-couple has varied, and a second pointer carried by said correction scale and coöperating with said main scale.

5. The combination with a thermo-couple, of a reading instrument associated therewith comprising a potentiometer, a scale associated therewith, a contact for balancing the potentiometer movable with respect to said scale, a correction scale having a pointer coöperating with said first named scale, and means for adjusting said correction scale to a position corresponding with the reference temperature of the cold junction of said thermo-couple.

6. The combination with a thermo-couple, of a reading instrument associated therewith comprising a potentiometer, a scale associated therewith, a contact for balancing the potentiometer movable with respect to said scale, a correction scale having a pointer coöperating with said first named scale, and means for adjusting said correction scale to a position corresponding with the reference temperature of the cold junction of said thermo-couple, said scales having markings derived from the calibration of said thermo-couple with its cold junction maintained at constant calibration temperature.

7. The combination with a thermo-couple, of a reading instrument associated therewith comprising a potentiometer, a scale associated therewith, a contact for balancing the potentiometer movable with respect to said scale, a correction scale having a pointer coöperating with said first named scale, and means for adjusting said correction scale with respect to said movable contact to a point corresponding with the reference temperature of the cold junction of said thermo-couple.

8. The combination with a thermo-couple, of a reading instrument associated therewith, said reading instrument having a scale derived from the calibration of said thermo-couple with its cold junction maintained at constant calibration temperature, circuit adjusting means comprising coöperating stationary and rotatable members, said scale being rotatable with the rotatable member of said circuit adjusting means, a correction scale carrying a pointer coöperating with said first named scale, and means for adjusting said correction scale with respect to the stationary member of said circuit adjusting means to a point corresponding with the reference temperature of the cold junction of said thermo-couple.

9. The combination with a thermo-couple, of a reading instrument associated therewith, said reading instrument having a plurality of scales, a correction scale having a pointer coöperating with each of said first named scales, circuit adjusting means, and means for adjusting the pointers of said correction scale with respect to said first named scales to a point corresponding with the reference temperature of the cold junction of said thermo-couple.

10. The combination with a thermo-couple, of a reading instrument associated therewith, said reading instrument having a plurality of scales derived from the calibration of said thermo-couple with its cold junction maintained at constant calibration temperature, circuit adjusting means comprising coöperating stationary and movable members, said scales being movable with a movable member of said circuit adjusting means, a correction scale carrying pointers coöperating with said first named scales, and means for adjusting said correction scale with respect to a stationary member of said circuit adjusting means to a point corresponding with the reference temperature of the cold junction of said thermo-couple.

11. The combination with a thermo-couple, of a plural range reading instrument associated therewith, said reading instrument having a plurality of different scales corresponding with the different ranges of said instrument, said scales derived from the calibration of said thermo-couple with its cold junction maintained at constant calibration temperature, a plural range correction scale carrying a pointer coöperating with each of said first named scales, circuit adjusting means, a pointer coöperating with each of the different range scales of said correction scale, and means for adjusting said correction scale with respect to said last named pointers to a point corresponding with the reference temperature of the cold junction of said thermo-couple.

12. The combination with a thermo-couple, of a plural range reading instrument associated therewith, said reading instrument having a plurality of scales corresponding with the different ranges of said reading instrument derived from the calibration of said thermo-couple with its cold junction maintained at constant calibration temperature, circuit adjusting means comprising coöperating stationary and movable members, said scales movable with a movable member of said circuit adjusting means, a plural range correction scale having pointers coöperating with said first named scales, and means for adjusting said correction scale with respect to a stationary member of said circuit adjusting means to a point corresponding with the reference temperature of the cold junction of said thermo-couple.

In testimony whereof I have hereunto affixed my signature in the presence of the two subscribing witnesses.

MORRIS E. LEEDS.

Witnesses:
A. S. MARSH,
N. B. EVANS.